(12) United States Patent
Ryan

(10) Patent No.: US 6,411,713 B1
(45) Date of Patent: Jun. 25, 2002

(54) METHOD OF ADAPTIVE CONTROL OF THE PRESENCE OF A COPY PROTECTION SIGNAL

(75) Inventor: John O. Ryan, Cupertino, CA (US)

(73) Assignee: Macrovision Corporation, Santa Clara, CA (US)

( * ) Notice: Subject to any disclaimer, the term of this patent is extended or adjusted under 35 U.S.C. 154(b) by 0 days.

(21) Appl. No.: 09/202,395

(22) PCT Filed: Jul. 16, 1997

(86) PCT No.: PCT/US97/12698

§ 371 (c)(1),
(2), (4) Date: Dec. 9, 1998

(87) PCT Pub. No.: WO98/04084

PCT Pub. Date: Jan. 29, 1998

(51) Int. Cl.[7] .............................................. H04N 7/167
(52) U.S. Cl. .......................... 380/203; 348/666; 386/94
(58) Field of Search .................. 380/202, 203, 380/204; 348/665, 667, 666; 386/94

(56) References Cited

U.S. PATENT DOCUMENTS

| 4,631,603 A | | 12/1986 | Ryan | |
|---|---|---|---|---|
| 5,337,157 A | * | 8/1994 | Nakata | 386/94 |
| 5,404,172 A | * | 4/1995 | Berman et al. | 348/465 |

* cited by examiner

*Primary Examiner*—Gilberto Barron
(74) *Attorney, Agent, or Firm*—G. Almeida

(57) ABSTRACT

A method and apparatus for adaptively controlling the presence of copy protection signals in a video signal depends upon the scene content of the video signal during an upper portion of a display of the video signal. Thus, in the upper portion of the scenes, wherein picture information would be noticeably altered by a hooking process the copy protection process is deactivated or effectively reduced to eliminate or reduce the hooking or tearing effects. The adaptive control of the copy protection improves the playability performance of copy protected video signals on a very small minority of television receivers which display a small hooking or tearing characteristic in the upper portion of the display of the copy protected video signal.

19 Claims, 1 Drawing Sheet

METHOD OF ADAPTIVE CONTROL OF THE PRESENCE OF A COPY PROTECTION SIGNAL

BACKGROUND OF THE INVENTION

1. Field of the Invention

The present invention pertains to a method for processing a video signal and, more particularly, to adaptively sensing certain video signal content in specific areas of a video signal and controlling the presence of selected copy protection signals in response to the certain video signal content.

2. Description of the Prior Art

The present invention relates to a method and apparatus for improving playability of certain copy protection techniques that modify a color video signal in such a manner that a conventional television receiver produces a normal color picture from the modified signal, whereas a videotape recording made from the modified signal exhibits very annoying color interference.

Video anticopy processes are well known. An example is U.S. Pat. No. 4,631,603 ('603) issued Dec. 23, 1986 to J. Ryan, and incorporated herein by reference. The '603 patent discloses inter alia (see Abstract):

"A video signal is modified so that a television receiver will still provide a normal color picture from the modified video signal while the video tape recording of the modified video signal produces generally unacceptable pictures. The invention relies on the fact that typical video cassette recorder automatic gain control systems cannot distinguish between the normal sync pulses (including equalizing or broad pulses) of a conventional video signal and added pseudo-sync pulses. Pseudo-sync pulses are defined here as any other pulses which extend down to normal sync tip level and which have a duration of at least 0.5 microseconds. A plurality of such pseudo-sync pulses is added to the conventional video signal during the vertical blanking interval, and each of said pseudo-sync pulses is followed by a positive pulse of suitable amplitude and duration. As a result, the automatic gain control system in a videotape recorder will make a false measurement of video level which causes an improper recording of the video signal. The result is unacceptable picture quality during playback."

The '603 patent, column 2, beginning at line 5, states that the added pulse pairs (each pair being a negative-going pseudo-sync pulse followed by a positive-going "AGC" pulse) cause an automatic level (gain) control circuit in a videotape recorder to erroneously sense video signal level and produce a gain correction that results in an unacceptable videotape recording.

Another example of a video anticopy process is disclosed in U.S. Pat. No. 4,819,098 ('098) issued on Apr. 4, 1989 to J. Ryan, and incorporated herein by reference. The '098 patent discloses (see Abstract):

"A video signal is modified so that a television/monitor receiver still produces a normal picture from a modified signal, whereas a videotape recording of this signal produces generally unacceptable pictures. Videotape recorders have an automatic gain control circuit which measures the sync pulse level in a video signal and develops a gain correction signal for keeping the video signal level applied to an FM modulator in the video tape recording system at a fixed, predetermined value. A plurality of pulses are added immediately following a respective trailing edge of a normally occurring sync pulse. These added pulses are clustered at the vertical blanking interval of each field to minimize the affect of the same on the viewability of the picture defined by the signal while causing the automatic gain control circuit in a recorder to assess the video level at many times its actual value. The sync pulses themselves can also be at a reduced level, in order to enhance the effectiveness of the process."

Therefore these prior art "basic anticopy processes" cause an abnormally low amplitude video signal to be recorded when a copy is attempted. Some of the effects observed when the illegal copy is replayed are horizontal tearing (positional displacement) and vertical displacement of the picture. Whether this occurs or not is often large dependent on the picture content, i.e., presence of white (light) and black (dark) areas in the picture. Therefore this prior art process, while generally providing excellent copy protection and normal picture quality in most types of television sets, may display a minor amount of hooking or tearing at the top portion of the picture in a very small minority of television sets. Thus there is a need for an adaptive control of the copy protection process which removes the visibility of this minor hooking or tearing of the displayed picture when viewing the copy protection signal.

SUMMARY OF THE INVENTION

It is an object of the present invention to provide an improved method and apparatus of modifying a video signal so that all conventional television receivers produce a normal color picture from the modified signal, whereas a videotape recording made from the modified signal exhibits annoying interference, thus discouraging or inhibiting videotaping of the signal.

It is a further object of the invention to provide a method and apparatus for detecting the scene content in an upper portion of a video picture, and for adaptively activating or deactivating the insertion of a copy protection signal depending upon preselected conditions which are detected in the scene.

To this end, the invention includes a circuit in a conventional video processing system of, for example, a digital video disk or tape master production facility, which circuit detects picture information, which would be noticeably altered by hooking, in the upper portion of a television picture. Upon detecting a preselected amount of the picture information which would be noticeably altered by hooking, the circuit supplies a signal, for example, a digital bit, which disables the copy protection process so that the copy protection signal is not added to the video signal in the upper portion of the video picture. In the absence of the noticeably alterable picture information in the upper portion of the picture, the copy protection process is enabled. Likewise, the copy protection process is enabled for the remaining majority of the video picture in the usual procedure for applying copy protection.

These and other features, aspects, and advantages of the present invention will become better understood with regard to the following description, appended claims and accompanying drawings.

DETAILED DESCRIPTION OF THE EMBODIMENTS

Figure 1:
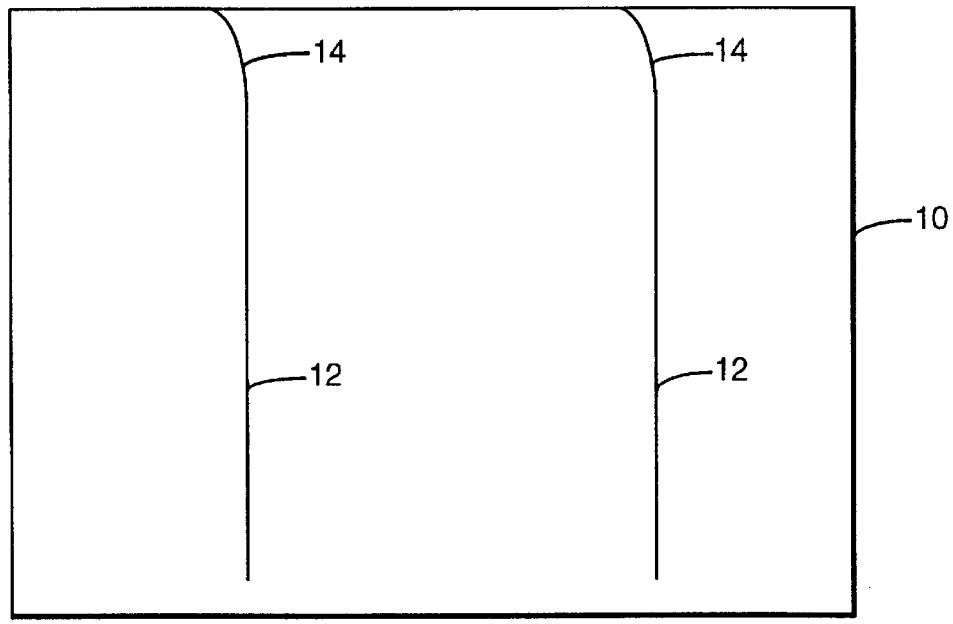
FIG. 1 is a graph depicting a display of vertical lines in a television picture, which includes the affects of hooking.

As described above, certain copy protection signals provide very effective copy protection of the recorded video signal, with an overwhelming majority of television receivers displaying no artifacts or adverse affects from the copy protection signal. There is however an occasional small amount of tearing or hooking at the top of a displayed picture on a very small number of television receivers. FIG. 1 depicts the affect of the hooking phenomenon on, for example, vertical lines in a picture displaying such hooking.

The visibility of any hooking depends upon the scene content at the very top of the displayed picture. For example, the first 5% to 10% of the active video picture in an NTSC color television standard. In order to reduce the visibility of hooking on any television receiver while retaining the overall need for copy protected video signals, the basic concepts of the present invention include means for detecting the scene content in the upper portion of the video signal. Such a detection circuit detects picture information which would be noticeably altered by hooking and on a scene by scene basis adaptively activates or deactivates the copy protection signal in the upper portion of the picture where the hooking occurs. The picture content of primary concern is for example the information which would be noticeably altered by hooking as shown in FIG. 1, which depicts a television display 10 with substantially straight edges depicted herein as vertical lines 12 in the display. The hooking or tearing characteristic in the vertical lines 12 is shown at 14. It is to be understood that the lines 12 can be at some angle relative to vertical, for example, within about ±60° of vertical, as further described below.

Generally the content at the top of a television display contains little detail. A typical example is a sky scene with a flat blue sky with little or no detail. Such a scene would not display the hooking characteristic shown at 14 in FIG. 1. During scenes with little or no detail at the top of the picture, the adaptive control system of the invention activates the copy protection system with no adverse affects on any television receiver. However, if the scene content contains picture information which would be noticeably altered by hooking such as the vertical lines 14, the present adaptive control systemde activates or reduces the effectiveness of the copy protection system, thus reducing or eliminating the hooking or tearing effects.

One technique of the invention for determining whether the copy protection process should be activated or deactivated in the upper portion of the picture, looks for picture information in the top portion of the picture, for example, the first 5% to 10% of the active video image, which if bent as by the hooking process, would be noticeable to a viewer.

Thus, the technique and associated apparatus look in the top 20 lines of the active video picture for substantially straight or very slightly curved edges that are within an angle of about ±60° relative to vertical. If such information is detected, then the copy protection process is deactivated for the corresponding upper portion of the picture.

Figure 2:
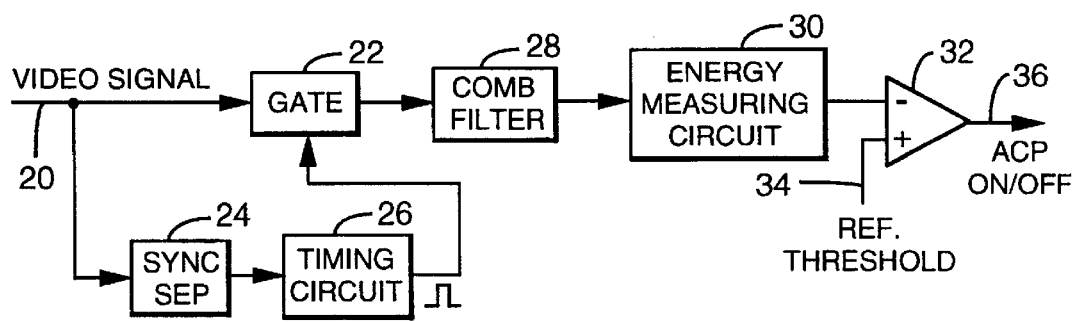
FIG. 2 is a block diagram illustrating a technique and associated circuitry for practicing the method of the present invention.

To this end, FIG. 2 illustrates by way of example only, an embodiment of circuitry for adaptively activating or deactivating an associated copy protection system such as those illustrated in the '603 and '098 patents of previous mention. The technique of FIG. 2 is based on assumptions that substantially straight, or very slightly curved, edges in the upper portion of the picture would be noticeably altered by hooking, which may not be the case in some instances. It follows that the invention may deactivate the copy protection process when such action is unnecessary, which is preferable to the alternative of unwittingly subjecting viewers the hooking or tearing effect. The compromise also lends itself to the fact that the circuitry for practicing this embodiment of the invention is correspondingly simple.

Referring thus to FIG. 2, a video signal is supplied via an input lead 20 to a gate circuit 22 and to a sync separator circuit 24. Typical sync signals are supplied from the circuit 24 to a timing circuit 26 which, in turn, supplies a gate pulse which gates the gate circuit 22. The timing circuit 26 is configured to generate the gate pulse for the first about 5% to 10% of the video picture, for instance, starting at line 21 and ending at line 40 in an NTSC color television standard. The gate pulse opens the gate circuit 22 which supplies the video signal to an analyzer circuit formed, in part, of a comb filter 28 in this particular embodiment of the invention. The comb filter 28 has a transfer characteristic typical of a comb filter but, in this particular embodiment, with the peaks of the comb set at the harmonics of the horizontal line frequency, and the width between each of the peaks equal to about 60 Hertz (Hz). Thus, the configuration of the comb filter 28 based on the premise that any picture information, for example, a substantially straight edge, that repeats itself from one horizontal line to the next vertically, must be at line frequency. Further, if the information is at an angle relative to vertical, such as within the ±60° of previous mention, it must be slightly less or slightly greater than the line frequency.

The output of the comb filter 28 is supplied to an energy measuring circuit 30 of the analyzer circuit of previous mention which measures the power or energy in the particular band of frequencies. The resulting output of the energy measuring circuit 30 is a DC voltage representative of the energy in a particular band, and is supplied to an inverting input of a comparator 32. The noninverting input of the comparator is supplied with a selected reference threshold voltage at 34. The output of the comparator 32 on a lead 36 constitutes a control signal, that is, one bit of the digital video stream, which activates or deactivates the copy protection process. Thus, if the DC voltage from the circuit 30 exceeds the reference threshold level at 34, the output of the comparator 32 goes low and deactivates the copy protection process. If the DC voltage remains below the reference threshold level, the resulting high logic level on the lead 36 activates the copy protection process. A typical copy protection process which is controlled by the present invention is disclosed in the '603 patent of previous mention. The comparator 32 includes the usual hysteresis to prevent the unstable on/off switching that would occur in the event that the DC voltage from the energy measuring circuit 30 is at the same level as the reference threshold.

The present invention is located in, for example, a digital video disk, video tape, etc., master production facility, where the decision is made to activate or deactivate the copy protection process. The decision is made by setting the previously mentioned bit in the digital stream of the master disk, tape, etc., whereupon the bit activates or deactivates the copy protection process when a subsequent digital disk, tape, etc., is played by a viewer.

It is to be understood that other parameters and/or characteristics of the video image may be used to determine the presence or absence of the hooking process in the upper portion of the image. For example, in an alternative embodiment of the invention, the first 20% of the image, for example the first 50 active video lines thereof, may be analyzed in order to compare the first 20 active video lines with the following 30 active video lines. The comparison determines whether in fact the first 20 lines contain the effects of hooking, since any curved or straight edges in the first 20 lines are continued in the following 30 lines, and the presence of hooking in the first 20 active video lines would be readily noticeable. This technique, though requiring more complex apparatus, provides a relatively precise determination of whether the copy protection process should be activated or deactivated.

It should be clear that the present invention is not limited to the precise details of the embodiments disclosed, and various modifications can be made by those skilled in this art without departing from the true spirit and scope of the invention as defined by the following claims and their equivalents.

What is claimed is:

1. A method of adaptively controlling the presence or absence of copy protection signals within a selected portion of the active video signal, comprising:

detecting the presence of picture information which would be noticeably altered by hooking or tearing, in an upper portion of a display of the active video signal;

activating the copy protection signals when the video signal is lacking said picture information in the upper active video portion of the display; and deactivating the copy protection signals when the video signal contains said picture information in the upper active video portion of the display.

2. The method of claim 1 wherein the step of detecting includes:

defining a selected plurality of horizontal television lines corresponding to said upper active video portion of the display; and generating a control signal indicative of the presence or absence of said picture information, wherein the activating and deactivating is in response to the control signal.

3. The method of claim 2 wherein the detecting further includes:

filtering the video signal to provide a selected band of frequencies related to horizontal line frequency;

determining if the energy in the selected band of frequencies is less or greater than a preselected threshold to generate therefrom said control signal.

4. The method of claim 3 wherein the determining includes:

measuring the energy in the selected band of frequencies to provide a corresponding DC voltage; and comparing the DC voltage with the preselected threshold to generate the control signal as logic levels indicative of whether the measured energy is less or greater than the threshold.

5. The method of claim 2 wherein said picture information comprises substantially straight edges that are within an angle of about ±60° of vertical.

6. The method of claim 2 wherein the upper active video portion of the display comprises generally the first 5% to 10% of the active video image.

7. The method of claim 2 wherein the selected plurality of horizontal television lines comprises about the first 10 to 20 lines of the active video image.

8. Apparatus for adaptively controlling the application of a copy protection process to a selected portion of a video signal, comprising:

means for examining the content of an image of the video signal in an upper active video portion of the video signal image to determine if any hooking or tearing would be visually perceptible; and means for deactivating the application of the copy protection process in the event the hooking or tearing is visually perceptible.

9. The apparatus of claim 8 wherein:

the examining means further detects that any hooking or tearing would not be visually perceptable; and the deactivating means further includes means for activating the application of the copy protection process in response to the hooking on tearing not being visually perceptable.

10. The apparatus of claim 8 wherein the examining means includes:

means for defining a selected plurality of lines corresponding to the upper active video portion of the video signal image; and analyzer means responsive to the defining means for generating a control signal indicative of the content of the video signal image in the upper active video portion thereof.

11. The apparatus of claim 10 wherein the defining means includes:

sync separating means receiving the video signal for providing selected sync signals;

a timing circuit responsive to the sync signals for providing a gate pulse indicative of the plurality of lines; and gate means responsive to the gate pulse for supplying the video signal during the plurality of lines.

12. The apparatus of claim 10 wherein the analyzer means includes:

filter means receiving the upper portion of the video signal picture for providing a selected band of frequencies related to line frequency; and means for determining the energy in the selected band of frequencies and for generating a control signal for selectively deactivating the copy protection process.

13. The apparatus of claim 12 wherein the determining means includes:

energy measuring means responsive to said filter means for producing a DC voltage indicative of the energy in the band of frequencies; and comparator means for generating the control signal in response to the DC voltage being greater than a selected threshold.

14. The apparatus of claim 12 wherein the filter means includes:

a comb filter with the peaks thereof set at the harmonics of the line frequency.

15. A method for adaptively controlling the application of copy protection to a video signal, comprising:

defining an upper portion of an image of the video signal;

examining the content of the image in said upper portion to determine if any hooking therein would be visually perceptable; and deactivating the application of copy protection in the event the hooking is visually perceptable.

16. The method of claim 15 wherein the defining includes:

counting a selected plurality of lines in the active video image corresponding to the upper portion thereof; and providing a timing signal indicative of the selected plurality of lines.

17. The method of claim 16 wherein the examining includes:
    analyzing, in response to the timing signal, the selected plurality of lines to determine if the active video image in the plurality of lines would be noticeably altered by the hooking; and
    generating a control signal for deactivating the application of the copy protection if the active video image in the plurality of lines would be noticeably altered by the hooking.

18. The method of claim 16 wherein the plurality of lines comprises about the first 5% to 10% of the lines in the active video image.

19. The method of claim 15 wherein the content of the image in said upper portion comprises substantially straight or very slightly curved edges that are within an angle of about ±60° of vertical.

* * * * *